United States Patent
Ferguson (10) Patent No.: US 9,976,507 B2
(45) Date of Patent: May 22, 2018

(54) SYSTEMS FOR FILTERING A VOLTAGE SIGNAL

(71) Applicant: General Electric Company, Schenectady, NY (US)

(72) Inventor: Matthew Ferguson, Erie, PA (US)

(73) Assignee: General Electric Company, Schenectady, NY (US)

( * ) Notice: Subject to any disclaimer, the term of this patent is extended or adjusted under 35 U.S.C. 154(b) by 311 days.

(21) Appl. No.: 14/745,408

(22) Filed: Jun. 20, 2015

(65) Prior Publication Data
US 2016/0369734 A1    Dec. 22, 2016

(51) Int. Cl.
| | |
|---|---|
| F02D 41/30 | (2006.01) |
| F02M 51/06 | (2006.01) |
| F02M 61/04 | (2006.01) |
| F02M 63/00 | (2006.01) |
| H02M 1/44 | (2007.01) |
| H02M 3/156 | (2006.01) |
| H02M 1/14 | (2006.01) |
| F02D 41/20 | (2006.01) |
| F02D 41/22 | (2006.01) |
| F02M 43/00 | (2006.01) |

(52) U.S. Cl.
CPC ......... *F02D 41/3005* (2013.01); *F02D 41/20* (2013.01); *F02M 51/061* (2013.01); *F02M 61/04* (2013.01); *F02M 63/0015* (2013.01); *H02M 1/44* (2013.01); *H02M 3/156* (2013.01); *F02D 41/221* (2013.01); *F02D 41/30* (2013.01); *F02D 2041/2055* (2013.01); *F02D 2041/2068* (2013.01); *F02M 43/00* (2013.01); *H02M 1/143* (2013.01)

(58) Field of Classification Search
CPC ................ F02D 41/20; F02D 41/3005; F02D 2041/2068; F02M 51/061; F02M 61/04; H01F 7/1844; H01F 2007/1866; H01F 2007/1888; H02M 1/143; H02M 1/44; H02M 3/156; H02M 2003/1566
See application file for complete search history.

(56) References Cited

U.S. PATENT DOCUMENTS

| | | | |
|---|---|---|---|
| 5,843,136 A | * | 12/1998 | Zhu ...................... A61N 1/3712 607/13 |
| 6,898,092 B2 | | 5/2005 | Briere et al. |
| 2002/0191418 A1 | | 12/2002 | Clayton et al. |

(Continued)

FOREIGN PATENT DOCUMENTS

| | | |
|---|---|---|
| EP | 2720357 A2 | 4/2014 |
| WO | 2008092152 A2 | 7/2008 |

OTHER PUBLICATIONS

International Search Report and Written Opinion issued in connection with corresponding PCT Application No. PCT/US2016/037161 dated Sep. 27, 2016.

*Primary Examiner* — Erick Solis
*Assistant Examiner* — Anthony L Bacon
(74) *Attorney, Agent, or Firm* — GE Global Patent Operation; John A. Kramer (57) ABSTRACT

Various systems are provided for filtering EMI. In one example, a system comprises a poly-modal filter coupled to a load device, and a shield disposed between the load device and the poly-modal filter. The poly-modal filter comprises an EMI filter and a differential-common mode filter.

18 Claims, 7 Drawing Sheets

(56) References Cited

U.S. PATENT DOCUMENTS

| | | | |
|---|---|---|---|
| 2007/0052500 A1* | 3/2007 | Korich | H01R 13/719 333/202 |
| 2008/0099090 A1* | 5/2008 | Cook | F15B 13/0402 137/625.65 |
| 2010/0019862 A1 | 1/2010 | Feng et al. | |
| 2014/0184095 A1* | 7/2014 | Yoshinaga | H05B 33/0818 315/291 |
| 2015/0103571 A1* | 4/2015 | Zheng | H02M 1/44 363/44 |
| 2015/0171817 A1 | 6/2015 | Sun | |
| 2015/0188509 A1* | 7/2015 | Paepoot | H02H 9/005 333/181 |
| 2016/0252037 A1* | 9/2016 | Katsurahara | F02D 41/20 123/480 |
| 2017/0002765 A1* | 1/2017 | Nakano | F02D 41/34 |

* cited by examiner

SYSTEMS FOR FILTERING A VOLTAGE SIGNAL

BACKGROUND

Technical Field

Embodiments of the subject matter disclosed herein relate to a current drive system.

DISCUSSION OF ART

Current drive systems may include a power supply coupled to a load device via a cable. For example, a fuel injector solenoid may be energized via a voltage signal provided by a battery. When the current created by the voltage supply propagates along the cable, an electromagnetic field is created, which can be conducted along the cable and/or radiated into the surrounding environment, termed electromagnetic interference (EMI). The EMI created by the current drive system may be increased if the current drive system is a switching system, where a switch opens and closes at high frequency to create a pulse width modulated voltage signal, for example. The EMI may cause disturbances in nearby electronic devices and/or may shorten the life of the load device.

BRIEF DESCRIPTION

In one embodiment, a system includes a poly-modal filter coupled to a load device, and a shield disposed between the load device and the poly-modal filter. The poly-modal filter includes an EMI filter and a differential-common mode filter.

In this configuration, according to aspects of the invention, the poly-modal filter reduces both conducted and radiated electromagnetic emissions. In one example, the poly-modal filter may be disposed in a fuel injector drive circuit, where the load device is a solenoid that opens and closes a fuel injector. The poly-modal filter may filter out high-frequency, high-energy signals generated by the switch coupling the solenoid to a power supply, and therefore increase the life of the fuel injector. Further, the poly-modal filter may simultaneously reject both differential noise and common mode noise. In doing so, electronic devices operating in an environment near the fuel injector drive circuit may be protected from interference, while the fuel injector drive circuit may be operable to function more robustly in a noisy environment.

DETAILED DESCRIPTION

Figure 1:
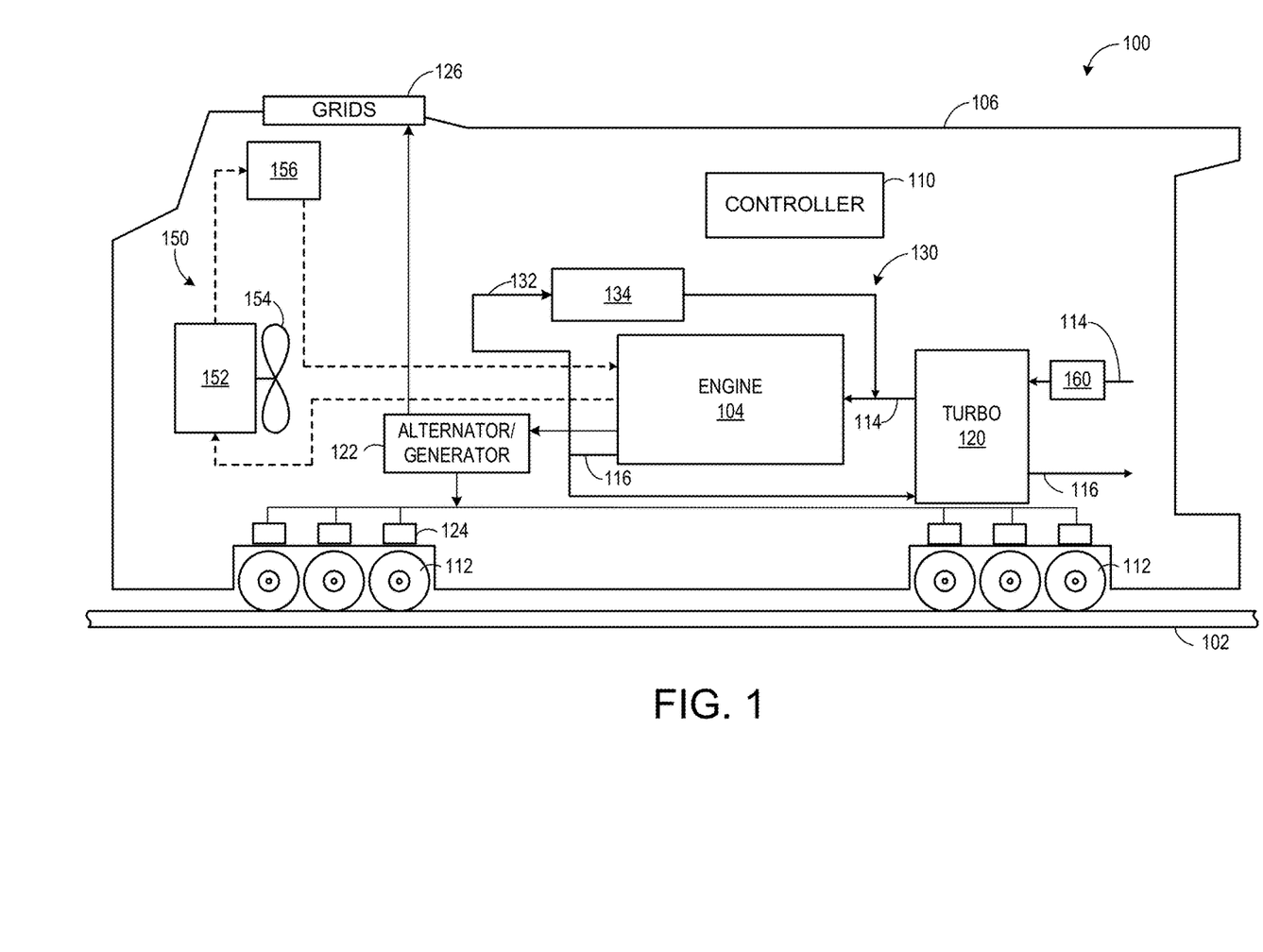
FIG. 1 shows a schematic diagram of an embodiment of a vehicle with an engine.
Figure 2:
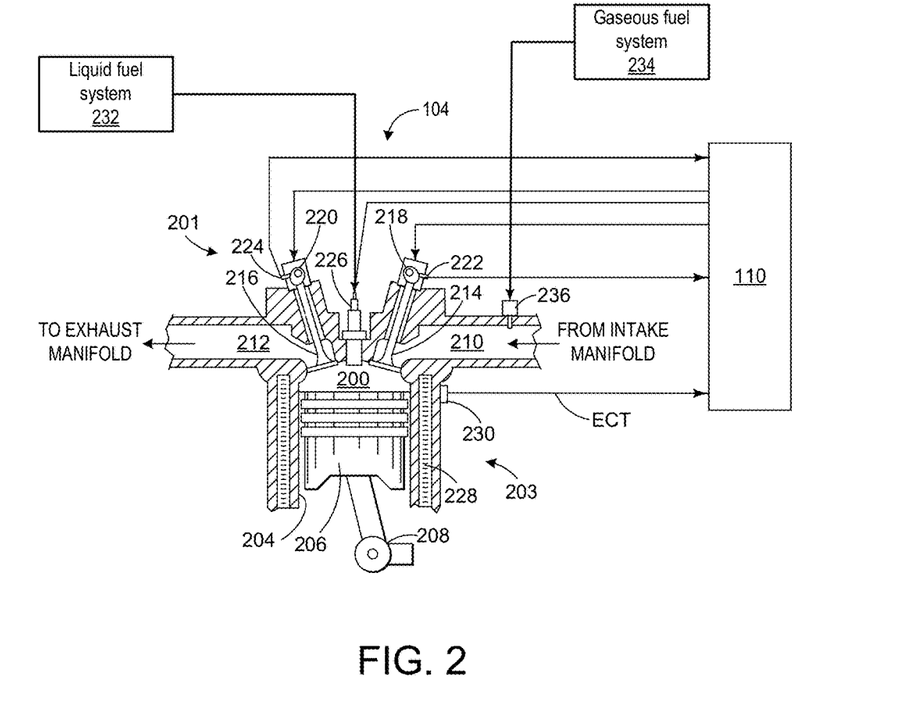
FIG. 2 shows a schematic diagram of an example of a cylinder of a multi-fuel engine.
Figure 3:
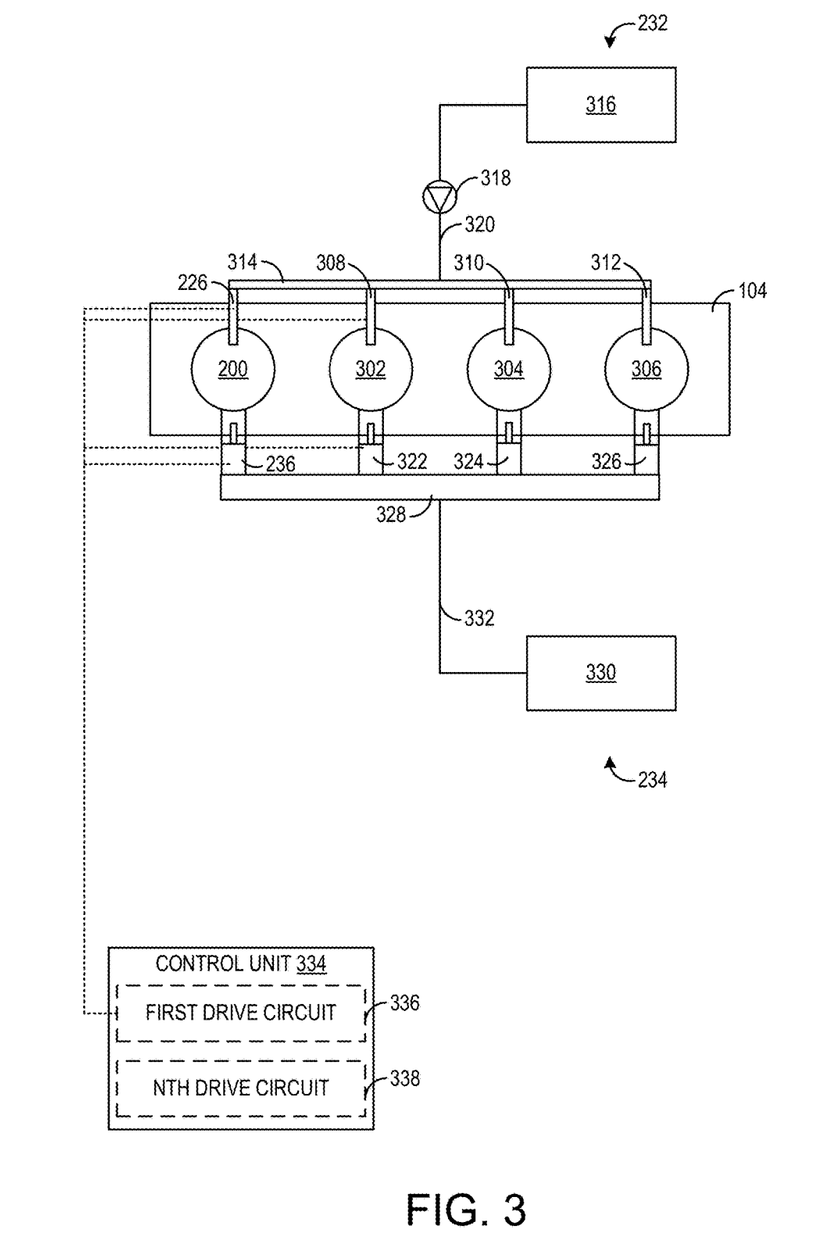
FIG. 3 shows a schematic diagram of an example of a multi-fuel engine.
Figure 5:
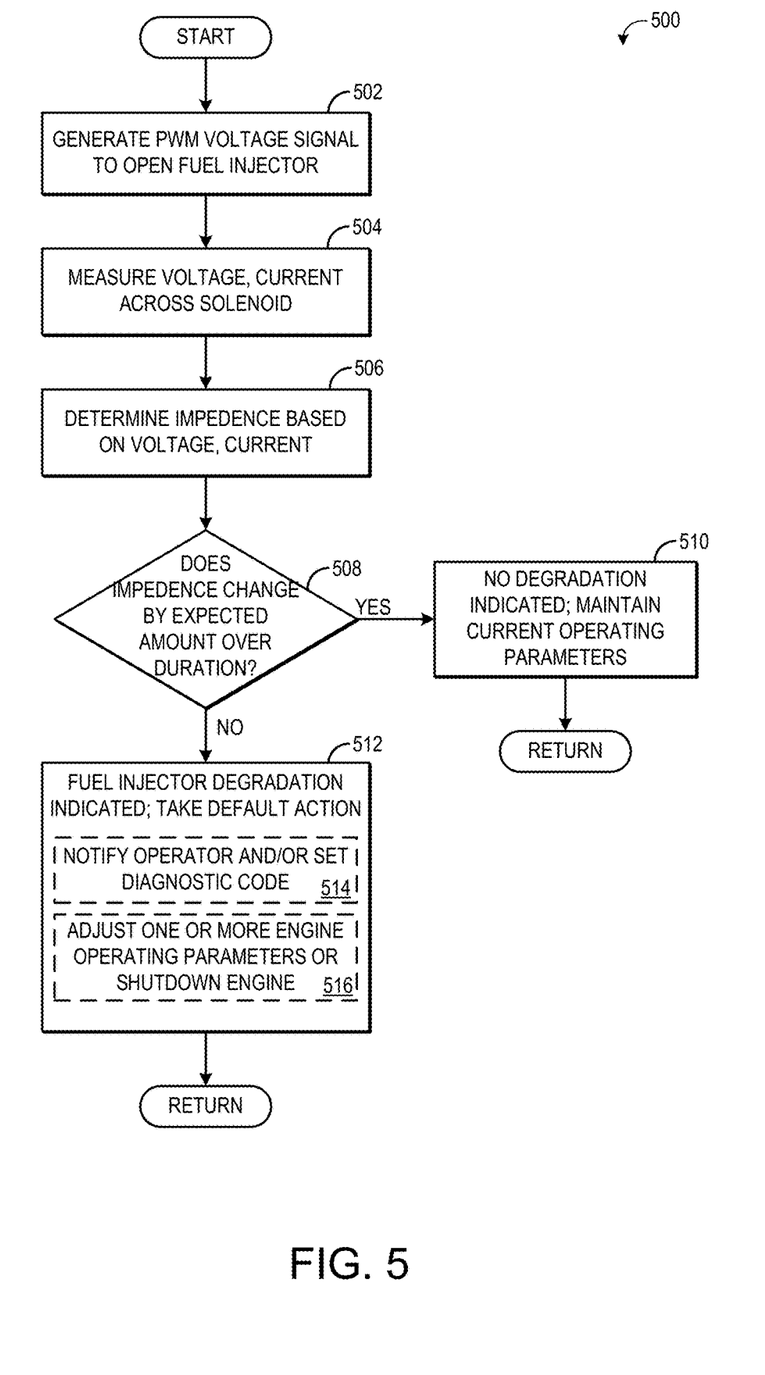
FIG. 5 is a flow chart illustrating an embodiment of a method for diagnosing a fuel injector.
Figure 6:
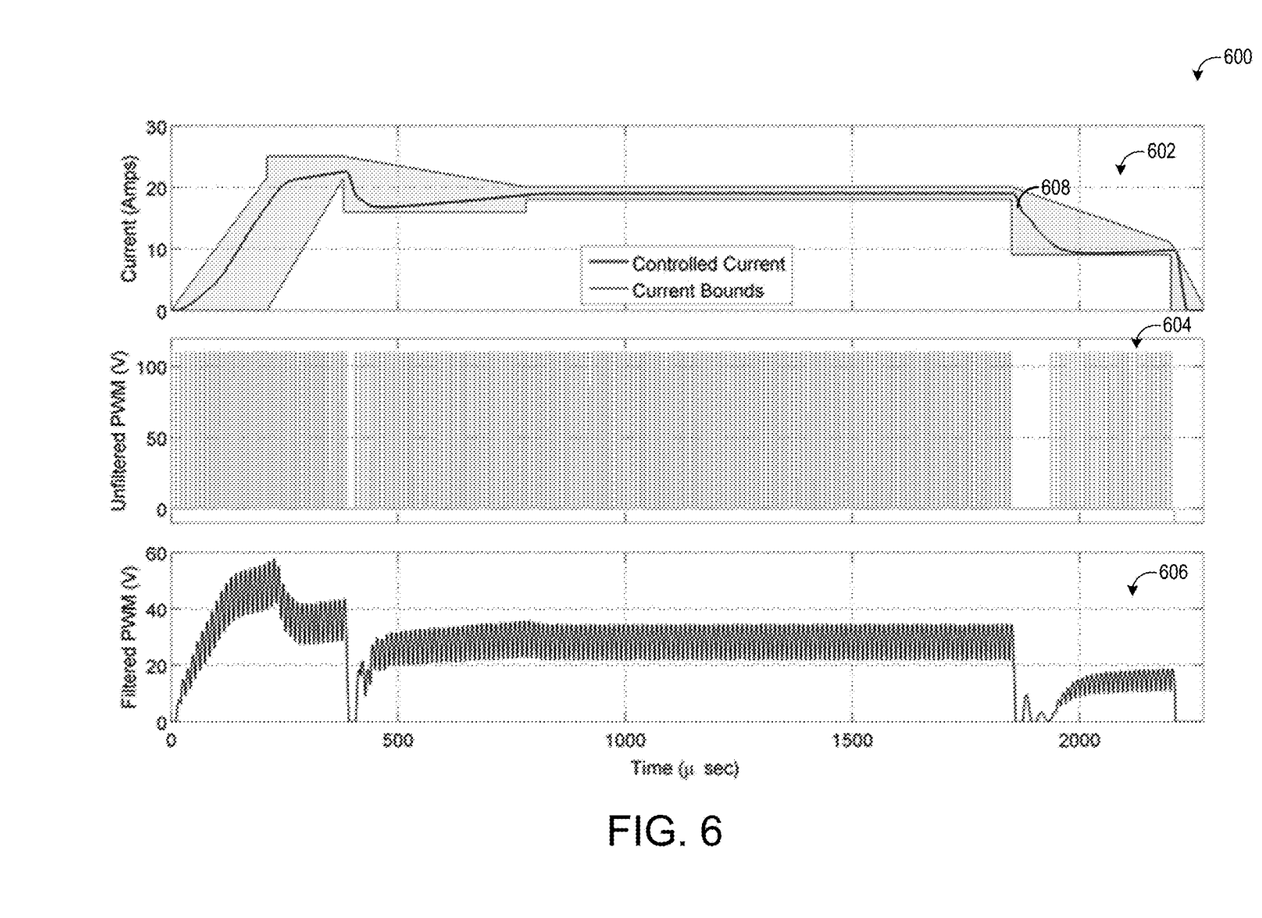
FIGS. 6 and 7 are diagrams illustrating parameters during an injector event.
Figure 7:
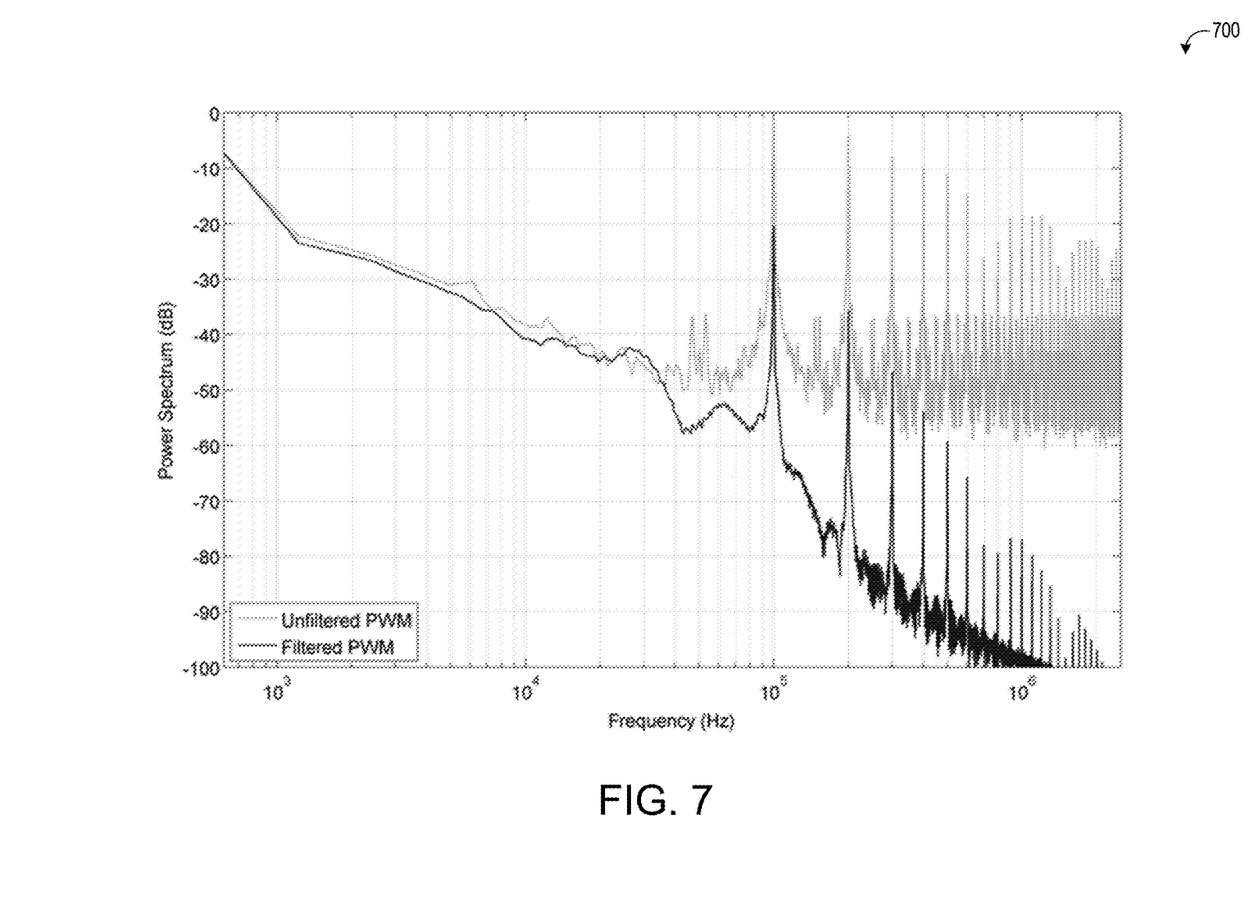

Embodiments of the subject matter disclosed herein relate to a system for reducing electromagnetic interference (EMI) in an electronic circuit. The system may include a poly-modal filter coupled to a load device. The poly-modal filter comprises an EMI filter and a differential-common mode filter. The system may further include a shield disposed between the load device and the poly-modal filter. In one example, the electronic circuit may be a fuel injector drive circuit that supplies a pulse width modulated (PWM) voltage signal to one or more fuel injectors of an engine. As used herein, "fuel injector" may refer to both liquid fuel injectors, for example diesel fuel injectors, and gaseous fuel admission valves. An example vehicle including an engine is illustrated in FIG. 1. The engine may be comprised of one or more cylinders each having one or more fuel injectors disposed thereto, as illustrated in FIG. 2. In some examples, the engine may be a multi-fuel engine configured to operate with two more fuels, as illustrated in FIG. 3. The fuel injectors may be controlled by a fuel injector drive circuit having a poly-modal filter described above, as shown in FIG. 4. The poly-modal filter may act to filter and hence smooth the PWM voltage signal at the fuel injector. This filtering may allow for more robust detection of fuel injector degradation. A flow chart illustrating an example method for detecting fuel injector degradation is illustrated in FIG. 5. FIGS. 6-7 illustrate example filtered and unfiltered PWM voltage signals during a fuel injector event.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a self-propelled rail vehicle, and more broadly, as an example of a mobile platform, supporting a system incorporating an embodiment of the invention.

Before further discussion of the approach for reducing EMI, an example of a platform is disclosed in which an engine may be configured for a vehicle, such as a rail vehicle. For example, FIG. 1 shows a block diagram of an embodiment of a vehicle system 100, herein depicted as a rail vehicle or other vehicle 106 (e.g., locomotive), configured to run on a rail 102 via a plurality of wheels 112. As depicted, the rail vehicle includes an engine 104. In other non-limiting embodiments, the engine may be a stationary engine, such as in a power-plant application, or an engine in a marine vessel or other off-highway vehicle propulsion system as noted above.

The engine receives intake air for combustion from an intake passage 114. The intake passage receives ambient air from an air filter 160 that filters air from outside of the vehicle. Exhaust gas resulting from combustion in the engine is supplied to an exhaust passage 116. Exhaust gas flows through the exhaust passage, and out of an exhaust stack of the vehicle. In one example, the engine is a diesel engine that combusts air and diesel fuel through compression ignition. In other non-limiting embodiments, the engine may alternatively or additionally combust fuel including gasoline, kerosene, natural gas, biodiesel, or other petroleum distillates of similar density through compression ignition (and/or spark ignition).

In one embodiment, the vehicle is a diesel-electric vehicle. As depicted in FIG. 1, the engine is coupled to an electric power generation system, which includes an alternator/generator 122 and electric traction motors 124. For example, the engine is a diesel and/or natural gas engine that generates a torque output that is transmitted to the generator which is mechanically coupled to the engine. In one embodiment herein, engine is a multi-fuel engine operating with diesel fuel and natural gas, but in other examples engine may use various combinations of fuels other than diesel and natural gas.

The generator produces electrical power that may be stored and applied for subsequent propagation to a variety of downstream electrical components. As an example, the generator may be electrically coupled to a plurality of traction motors and the generator may provide electrical power to the plurality of traction motors. As depicted, the plurality of traction motors are each connected to one of the plurality of wheels to provide tractive power to propel the vehicle. One example configuration includes one traction motor per wheel set. As depicted herein, six pairs of traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by the alternator/generator.

In some embodiments, the vehicle system may include a turbocharger 120 that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Further, in some examples, the vehicle system may additionally or alternatively include a supercharger, where a compressor is driven by a motor, for example.

In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or systems. In some examples, an aftertreatment system may not be included in the vehicle system, and engine emissions may be controlled in an alternative manner, such as via exhaust gas recirculation, described below.

The vehicle system may further include an exhaust gas recirculation (EGR) system 130 coupled to the engine, which routes exhaust gas from the exhaust passage of the engine to the intake passage downstream of the turbocharger. In some embodiments, the exhaust gas recirculation system may be coupled exclusively to a group of one or more donor cylinders of the engine (also referred to a donor cylinder system). As depicted in FIG. 1, the EGR system includes an EGR passage 132 and an EGR cooler 134 to reduce the temperature of the exhaust gas before it enters the intake passage. By introducing exhaust gas to the engine, the amount of available oxygen for combustion is decreased, thereby reducing the combustion flame temperatures and reducing the formation of nitrogen oxides (e.g., NOx).

In some embodiments, the EGR system may further include an EGR valve for controlling an amount of exhaust gas that is recirculated from the exhaust passage of the engine to the intake passage of the engine. The EGR valve may be an on/off valve controlled by a controller, or it may control a variable amount of EGR, for example. As shown in the non-limiting example embodiment of FIG. 1, the EGR system is a high-pressure EGR system. In other embodiments, the vehicle system may additionally or alternatively include a low-pressure EGR system, routing EGR from downstream of the turbine to upstream of the compressor.

As depicted in FIG. 1, the vehicle system further includes a cooling system 150. The cooling system circulates coolant through the engine to absorb waste engine heat and distribute the heated coolant to a heat exchanger, such as a radiator 152. A fan 154 may be coupled to the radiator in order to maintain an airflow through the radiator when the vehicle is moving slowly or stopped while the engine is running. In some examples, fan speed may be controlled by a controller. Coolant which is cooled by the radiator enters a tank 156. The coolant may then be pumped by a water, or coolant, pump (not shown) back to the engine or to another component of the vehicle system, such as the EGR cooler.

The vehicle further includes an engine controller 110 (referred to hereafter as the controller) to control various components related to the vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation.

The controller may receive information from a plurality of sensors and may send control signals to a plurality of actuators. The controller, while overseeing control and management of the vehicle, may be configured to receive signals from a variety of engine sensors, as further elaborated herein, in order to determine operating parameters and operating conditions, and correspondingly adjust various engine actuators to control operation of the vehicle. For example, the engine controller may receive signals from various engine sensors including, but not limited to, engine speed, engine load, intake manifold air pressure, boost pressure, exhaust pressure, ambient pressure, ambient temperature, exhaust temperature, engine coolant pressure, gas temperature in the EGR cooler, or the like. Correspondingly, the controller may control the vehicle by sending commands to various components such as the traction motors, the alternator/generator, cylinder valves, fuel injectors, a notch throttle, or the like. Other actuators may be coupled to various locations in the rail vehicle.

Each cylinder of the engine may be configured with one or more fuel injectors for providing fuel thereto. As a non-limiting example, a fuel injector may be directly coupled to the cylinder for injecting fuel directly therein. In this manner, the fuel injector provides what is known as direct injection of a fuel into the combustion cylinder. The fuel may be delivered to the fuel injector from a high-pressure fuel system including a fuel tank, fuel pumps, and a fuel rail. In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). Further, as explained in more detail below, each cylinder of the engine may be configured to receive gaseous fuel (e.g., natural gas) alternative to or in addition to diesel fuel. The gaseous fuel may be provided to the cylinder via the intake manifold, as explained below.

FIG. 2 depicts an embodiment of a combustion chamber, or cylinder 200, of a multi-cylinder internal combustion engine, such as the engine described above with reference to FIG. 1. The cylinder may be defined by a cylinder head 201, housing the intake and exhaust valves and liquid fuel injector, described below, and a cylinder block 203.

The engine may be controlled at least partially by a control system including controller 110 which may be in further communication with a vehicle system, such as the locomotive described above with reference to FIG. 1. As described above, the controller may further receive signals from various engine sensors including, but not limited to, engine speed, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. Correspondingly, the controller may control the vehicle system by sending commands to various components such as alternator, cylinder valves, throttle, fuel injectors, etc.

The cylinder (i.e., combustion chamber) may include cylinder liner 204 with a piston 206 positioned therein. The piston may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The cylinder receives intake air for combustion from an intake including an intake passage 210. The intake passage receives intake air via an intake manifold. The intake passage may communicate with other cylinders of the engine in addition to the cylinder 200, for example, or the intake passage may communicate exclusively with the cylinder 200.

Exhaust gas resulting from combustion in the engine is supplied to an exhaust including an exhaust passage 212. Exhaust gas flows through the exhaust passage, to a turbocharger in some embodiments (not shown in FIG. 2) and to atmosphere, via an exhaust manifold. The exhaust passage may further receive exhaust gases from other cylinders of the engine in addition to the cylinder 200, for example.

Each cylinder of the engine may include one or more intake valves and one or more exhaust valves. For example, the cylinder is shown including at least one intake poppet valve 214 and at least one exhaust poppet valve 216 located in an upper region of cylinder. In some embodiments, each cylinder of the engine, including the cylinder, may include at least two intake poppet valves and at least two exhaust poppet valves located at the cylinder head.

The intake valve may be controlled by the controller via an actuator 218. Similarly, the exhaust valve may be controlled by the controller via an actuator 220. During some conditions, the controller may vary the signals provided to the actuators to control the opening and closing of the respective intake and exhaust valves. The position of the intake valve and the exhaust valve may be determined by respective valve position sensors 222 and 224, respectively, and/or by cam position sensors. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

In some embodiments, each cylinder of the engine may be configured with one or more fuel injectors for providing fuel thereto. As a non-limiting example, FIG. 2 shows the cylinder including a fuel injector 226. The fuel injector is shown coupled directly to the cylinder for injecting fuel directly therein. In this manner, the fuel injector provides what is known as direct injection of a fuel into the combustion cylinder. The fuel may be delivered to the fuel injector from a first, liquid fuel system 232, including a fuel tank, fuel pumps, and a fuel rail (described in more detail with respect to FIG. 3). In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition).

Further, each cylinder of the engine may be configured to receive gaseous fuel (e.g., natural gas) alternative to or in addition to diesel fuel. The gaseous fuel may be provided to the cylinder via the intake manifold, as explained below. As shown in FIG. 2, the intake passage may receive a supply of gaseous fuel from a second, gaseous fuel system 234, via one or more gaseous fuel lines, pumps, pressure regulators, etc., located upstream of the cylinder. In some embodiments, the gaseous fuel system may be located remotely from the engine, such as on a different vehicle (e.g., on a fuel tender car), and the gaseous fuel may be supplied to the engine via one or more fuel lines that traverse the separate vehicles. However, in other embodiments the gaseous fuel system may be located on the same vehicle as the engine.

A plurality of gas admission valves, such as gas admission valve 236, may be configured to supply gaseous fuel from the gaseous fuel system to each respective cylinder via respective intake passages. For example, a degree and/or duration of opening of the gas admission valve may be adjusted to regulate an amount of gaseous fuel provided to the cylinder. As such, each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel. To regulate the amount of gaseous fuel provided by the single-point fumigation system, in some examples a gaseous fuel control valve may be positioned at a junction between a gaseous fuel supply line and the engine intake air supply line or intake manifold. The gaseous fuel control valve degree and/or duration of opening may be adjusted to regulate the amount of gaseous fuel admitted to the cylinders. In other examples, the amount of gaseous fuel admitted to the cylinders in the single-point fumigation system may be regulated by another mechanism, such as control of a gaseous fuel regulator, via control of a gaseous fuel pump, etc.

FIG. 3 illustrates multiple cylinders of engine 104, including cylinder 200, cylinder 302, cylinder 304, and cylinder 306. While four cylinders arranged in-line are illustrated in FIG. 3, such an arrangement is non-limiting, and other engine configurations are possible. For example, the engine may be a V-6, V-8, V-12, V-16, I-6, I-8, or other engine type. The engine may be supplied one or more of liquid fuel from the liquid fuel system and gaseous fuel from the gaseous fuel system. As such, each cylinder of the engine includes a liquid fuel injector, including injector 226 as well as injectors 308, 310, and 312. Each liquid fuel injector is supplied with liquid fuel from a common fuel rail 314. The common fuel rail may be supplied with fuel from a liquid fuel tank 316 (e.g., a diesel fuel storage tank). The fuel may be provided to the fuel rail at a high pressure via a fuel supply line 320 and one or more fuel pumps, such as pump 318. The liquid fuel in the liquid fuel system may be diesel fuel or another liquid fuel, such as gasoline, alcohol, etc. Further, while a common fuel rail system is illustrated in FIG. 3, a non-common rail unit pump injection system may be used.

Each cylinder of engine may similarly include a gas admission valve to supply gaseous fuel, including gas admission valve 236 as well as gas admission valves 322, 324, and 326. Each gas admission valve may be positioned in an intake passage of a respective cylinder, or other suitable location. The gas admission valves may be supplied gaseous fuel, such as natural gas, from a gaseous fuel passage 328. The gaseous fuel passage may receive gaseous fuel from a gaseous fuel tank (such as an LNG storage tank 330) via a gaseous fuel supply line 332. In some examples, the LNG storage tank may be located remotely from engine, such as on board a fuel tender, and may supply fuel to the gaseous fuel supply line via a fluidic coupling. In other examples, the gaseous fuel storage tank may located on board the same vehicle as the engine. Further, in some embodiments, the individual gas admission valves may be dispensed with, and all the cylinders may be supplied with the same gaseous fuel/intake air mixture from an upstream single-point fumigation system.

Each liquid fuel injector of each cylinder, as well as each gas admission valve of each cylinder, may be individually controlled by a controller (such as controller 110) to enable individual cylinder control of the fuel supply. Accordingly, each cylinder may be operated with varying levels of liquid fuel and/or gaseous fuel. In some embodiments, the liquid fuel injectors may be controlled by a different controller than the controller that controls the gas admission valves. Further, in a gaseous fumigation system, rather than controlling the individual gas admission valves, a single gaseous fuel control valve or other gaseous fuel control element may be controlled by the controller to regulate the amount of gaseous fuel admitted to the cylinders.

In an example, a mixture of gaseous fuel and air may be provided to cylinder 200 via the intake passage and, in some embodiments, the gas admission valve. Then, during compression, diesel fuel may be injected to cylinder 200 via fuel injector 226. The diesel fuel may be ignited via compression ignition and subsequently ignite the gaseous fuel. Similar combustion events may occur for each cylinder of engine.

Each fuel injector and gas admission valve may be controlled (e.g., opened and closed) by a fuel injector drive circuit. In some examples, each fuel injector and gas admission valve may be controlled by a separate drive circuit. In the example illustrated in FIG. 3, two liquid fuel injectors and two gas admission valves are controlled by the same drive circuit, such as first drive circuit 336. Accordingly, multiple drive circuits (e.g., Nth drive circuit 338) may be present to drive all the fuel injectors and gas admission valves. Each drive circuit may be at least partially housed in a control unit 334. The control unit may be separate from, but in communication with, the controller 110, or the control unit may be part of the controller. As shown, the first drive circuit is coupled to and is operable to control fuel injector 226 and gas admission valve 236 of cylinder 200 and fuel injector 308 and gas admission valve 322 of cylinder 302. By including multiple injectors on one circuit, use of some componentry may be reduced. Further, by including some liquid fuel injectors and some gas admission valves on the same circuit, the timing of the when each injector/gas admission valve is actuated is staggered, thus allowing for more injectors/valves on one circuit.

In some vehicles, the control unit may be located relatively far away from the engine, fuel injectors, and gas admission valves. In the example shown in FIG. 3, the control unit may be located in a separate cab from the engine, such as in an auxiliary cab. Further, the engine itself may be relatively large, particularly when the engine includes 12 or 16 cylinders. Accordingly, the wires (also referred to as the harnesses) coupling the control unit to the fuel injectors and gas admission valves may be relatively long, such as up to 50 feet (e.g., 15 meters). As the length of a given harness increases, the impedance in the drive circuit increases, causing an increase in the generated electromagnetic field and hence increased electromagnetic radiation. Further, each drive circuit may include a switch to generate a pulse width modulated voltage signal. Some drive circuits may be configured to drive their respective switches at relatively high frequencies, such as 100 kHz, and some fuel injectors may utilize high peak current (e.g., 26 amps), necessitating a high-voltage power supply (such as 110V). This high switching frequency and high voltage signal, together with the long harnesses, may cause significant EMI. The EMI may interact and interfere with other electronic devices, such as sensors present on the engine (e.g., NOx sensors).

To prevent radiation of EMI to nearby components, the drive circuits described herein may include one or more EMI filters. In one example, the EMI filter included in the drive circuit may be poly-modal, where multiple types of EMI are filtered and/or rejected. The EMI filter(s) may remove high frequency spectral energy (e.g., 100 kHz and its harmonics), thereby preventing the high frequency spectral energy from reaching the harness, where it would otherwise travel to and dissipate in the fuel injectors. The EMI filter(s) may further reject both differential and common mode noise.

Figure 4:
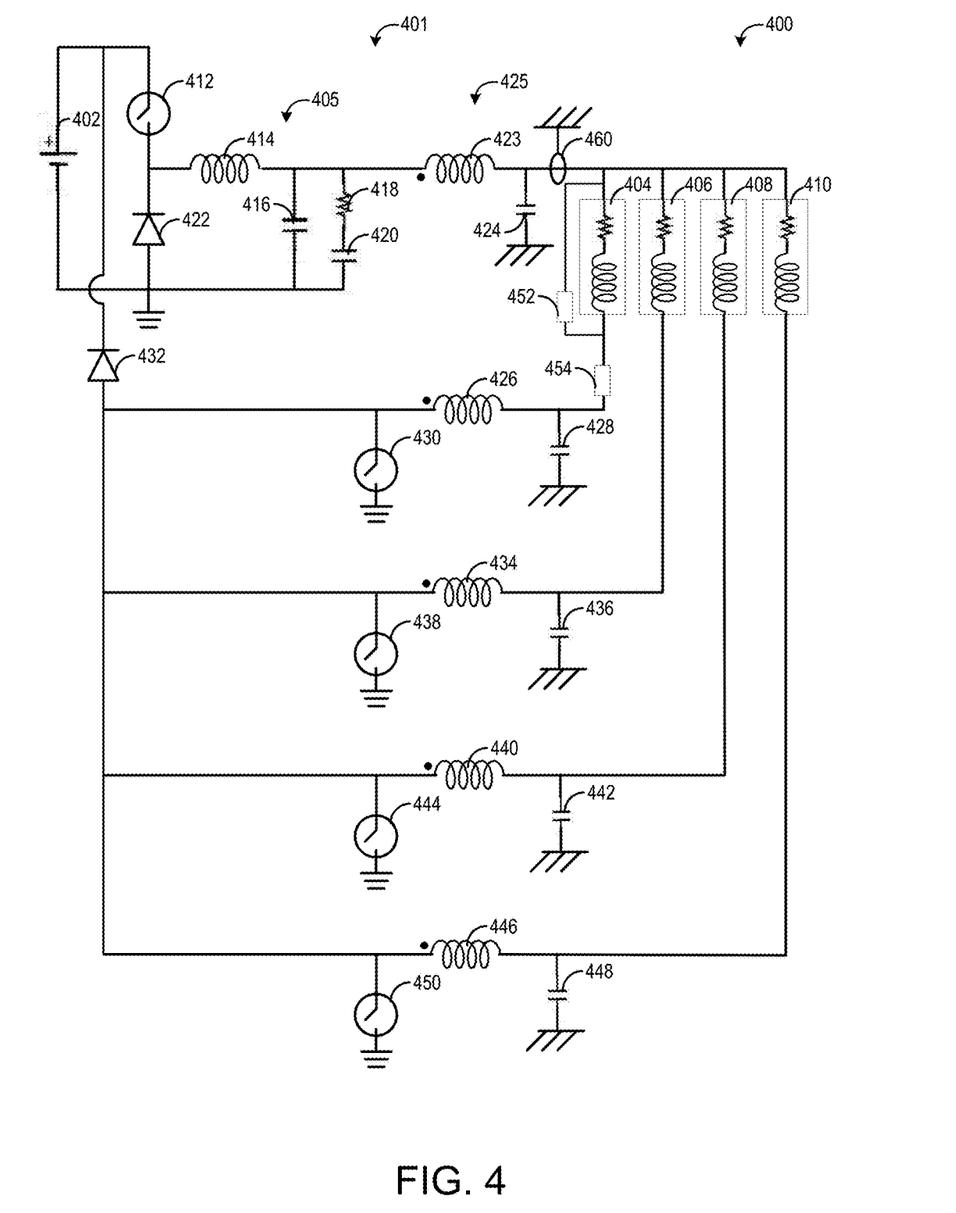
FIG. 4 shows a schematic diagram of an embodiment of an injector drive system including a poly-modal filter.

An example circuit diagram 400 illustrating a drive circuit, such as first drive circuit 336, is illustrated in FIG. 4. As explained above, the first drive circuit controls the liquid fuel injectors and gas admission valves for a set of two cylinders. Each fuel injector and gas admission valve includes a solenoid that, when energized, opens the fuel injector or gas admission valve. The first drive circuit couples a power supply to one or more selected fuel injectors and gas admission valves to provide a pulse width modulated voltage signal to the respective solenoid(s). Once the current in a given solenoid reaches an opening threshold, the solenoid acts to open the respective fuel injector or gas admission valve, allowing fuel to flow therethrough. The solenoid subsequently closes the fuel injector or gas admission valve once current drops below a closing threshold. To maintain a given solenoid within a designated current range, the PWM voltage signal may be adjusted based on feedback from voltage and/or current sensors present in the drive circuit.

The drive circuit includes a power supply 402. The power supply may include one or more of a battery, capacitor, alternator, or other suitable power source. The voltage from the power supply is supplied to a plurality of solenoids, herein illustrated as first solenoid 404, second solenoid 406, third solenoid 408, and fourth solenoid 410. Each solenoid of the plurality of solenoids is coupled to a respective fuel injector or gas admission valve. In one non-limiting example, the first solenoid may be coupled to the fuel injector 226 of FIG. 3, the second solenoid may be coupled to the gas admission valve 236 of FIG. 3, the third solenoid may be coupled to fuel injector 308 of FIG. 3, and the fourth solenoid may be coupled to gas admission valve 322 of FIG. 3. Each solenoid is coupled to a respective low-side (e.g., current return) line to complete a circuit for each solenoid. The drive circuit also may include a catch diode 432, herein illustrated as being coupled to the low-side lines.

The supply of voltage to the solenoids may be controlled by switch 412. In the illustrated example, switch 412 is positioned in the high-side (e.g., current supplying) line, and hence may be referred to as a high-side switch. The high-side switch may be a field effect transistor (FET) or other suitable switch. The high-side switch may be switched on and off (e.g., opened and closed) to create a pulse width modulated (PWM) voltage signal. The control of the high-side switch and hence PWM voltage signal may be carried out by a control unit, such as control unit 334 of FIG. 3, in order to flow a target current through a given solenoid. The PWM voltage signal may be adjusted to reach and/or maintain a designated current based on feedback from one or more voltage sensors and one or more current sensors, such as voltage sensor 452 and current sensor 454. Each solenoid may be controlled according to output from individual voltage and current sensors, or the voltage sensor and current sensor may be positioned such that one voltage and current sensor may measure voltage and current for all the solenoids. Further, each low-side line includes a respective low-side switch coupled to ground (including low-side switch 430 for the first solenoid, low-side switch 438 for the second solenoid, low-side switch 444 for the third solenoid, and low-side switch 450 for the fourth solenoid) that may act as injector selectors, as current will only be supplied to a given solenoid if its low-side switch is closed.

Thus, the high-side switch may be controlled to generate an unfiltered PWM voltage signal that, if one or more of the low-side switches is closed, causes a flow of current to and through one or more of the solenoids. If this unfiltered PWM voltage signal were to reach the solenoids, significant EMI could be radiated from the harnesses coupling the solenoids to the switch. Further, the high-frequency signal would be dissipated in the solenoids, leading to premature degradation of the fuel injectors and gas admission valves. Thus, the drive circuit includes a poly-modal filter 401 to reduce conducted and radiated EMI, as described below. The poly-modal filter may be coupled near the high-side switch. In some examples, the high-side switch and poly-modal filter may be housed in a control unit, such as control unit 334 of FIG. 3.

The poly-modal filter includes an EMI filter 405. The EMI filter acts as a low-pass filter that recirculates high-frequency signal content from the unfiltered PWM voltage signal. As illustrated, the EMI filter includes a filter inductor 414, filter capacitor 416, and a damping network including a resistor 418 and capacitor 420. The filter inductor has a first side coupled to the high-side switch and a second side coupled to a first side of the filter capacitor and a first side of the damping network. The second side of the capacitor and the damping network are each coupled to ground and back to the first side of the filter inductor via a commutational diode 422.

The EMI filter is a low-pass analog power filter that provides a significant reduction in the high-frequency signal content that is associated with the PWM voltage signal. PWM signals are high-frequency square-waves with duty cycles that are proportional to the desired output voltage. Without the EMI filter, the harnesses in the system are presented with the high frequency content high voltage PWM drive signal and the current is low-pass filtered only by the fuel injector impedance. The EMI low-pass filter circulates the high frequency energy in a tight loop within the control unit.

The existence of the EMI filter in the circuit also creates a filter choke that naturally results in a slew-limited current profile under short circuit conditions. This filter choke enables sufficient time for the circuit to open the high-side switch and protect against short circuit faults. Achieving successful short circuit protection with FET switches (such as the high-side switch) may be challenging without a current limiting/slewing device to provide adequate sense and response time to the fault condition.

The poly-modal filter further includes a differential-common mode filter 425. The differential-common mode filter simultaneously rejects both differential noise and common mode noise. In the illustrated example, the differential filtering may be carried out by an inductor 423 in the high-side line and a respective inductor in each low-side line, such as inductor 426, inductor 434, inductor 440, and inductor 446. The common mode filtering may be carried out by capacitors coupled to chassis ground, including capacitor 424 in the high-side line and respective capacitors in the low-side line (e.g., capacitor 428, capacitor 436, capacitor 442, and capacitor 448). The inductor 423 in the high-side line may create a mutually-induced voltage with each of the inductors in the respective low-side lines (e.g., inductor 426, inductor 434, inductor 440, and inductor 446) having a polarity marked with the dots. As illustrated in FIG. 4, when current "enters" the dotted terminal inductor 423, the reference polarity of the voltage induced in a respective inductor in the low-side line is positive at its dotted terminal. When current "leaves" the dotted terminal of a respective inductor in the low-side line, the reference polarity of the voltage induced in inductor in the high-side line is negative at its dotted terminal.

Thus, the common mode filter prevents high frequency radiated emissions and the differential filter increases system efficiency. Without the differential filter, common mode filtering may be inefficient because the PWM switch has to drive the common mode filter capacitors to chassis ground, resulting in high power dissipation in the PWM switch.

In some examples, the harnesses may be shielded by one or more shields, such as shield 460. The shield(s) may include a mesh of copper, aluminum, or other metal, a spiral winding of copper tape, a layer of conducting polymer, or other suitable composition. The shield acts as a Faraday cage to reduce electrical noise from affecting the signals, and to reduce electromagnetic radiation that may interfere with other devices.

Thus, the injector drive circuit of FIG. 4 includes a poly-modal filter to reduce conducted and radiated EMI, thus preventing electromagnetic emissions that may interfere with external electronic devices as well as preventing EMI in the environment surrounding the drive circuit from interfering with components of the drive circuit. While the poly-modal filter of FIG. 4 was described with respect to a circuit for driving a plurality of fuel injectors and gas admission valves, it is to be understood that such a poly-modal filter may be used to filter EMI in other types of circuits. The poly-modal filter filters high-frequency, high-energy signal content and thus results in a smooth voltage signal at the load-receiving device (e.g., fuel injector solenoid). This smooth voltage signal may enable robust detection of fuel injector degradation, explained below with respect to FIG. 5.

Turning now to FIG. 5, a method 500 for diagnosing a fuel injector is presented. Method 500 may be carried out according to non-transitory instructions stored on an electronic controller, such as controller 110 and/or control unit 334 of FIGS. 1 and 3, respectively, in combination with one or more sensors and actuators, such as voltage sensor 452 and current sensor 454.

At 502, method 500 includes generating a PWM voltage signal to open a fuel injector. The PWM voltage signal may be generated to flow current through the fuel injector solenoid at an opening threshold to open the fuel injector and maintain the current at a reference current profile to hold the injector in an open position. The reference current profile may be selected based on desired engine output (e.g., the fuel injector may be opened for a selected duration to supply an amount of fuel necessary to achieve the desired engine output). An example current waveform for opening a fuel injector is illustrated in FIG. 6, described in more detail below. This PWM voltage signal may be filtered by a poly-modal filter, as described above with respect to FIG. 4.

At 504, the voltage and current across the solenoid are measured, using the voltage and current sensors described above. The voltage and current readings may be used as feedback to control the PWM voltage signal, and may be sampled over the duration of the fuel injection event. At 506, the impedance of the fuel injector is determined based on the current and voltage.

At 508, method 500 includes determining if the impedance changes by an expected amount over the duration of the fuel injection event. The solenoid of the fuel injector may move the injector needle when energized (e.g., at the opening threshold current), and this movement may cause the impedance of the solenoid to change. For example, when the needle moves to open the fuel injector, the impedance of the injector may increase. If the impedance does not change by the expected amount, it may indicate that the injector is stuck open or closed.

Thus, if at 508 it is determined that the impedance does change by the expected amount, method 500 proceeds to 510 to indicate no fuel injector degradation and maintain current operating parameters, which may include performing method 500 on a subsequent fuel injector. If the impedance does not change by the expected amount, method 500 proceeds to 512 to indicate fuel injector degradation and take default action. The default action may include one or more of notifying an operator of the engine (e.g., an operator of the vehicle in which the engine is installed) via a malfunction indicator or setting a diagnostic code, as indicated at 514. Further, in some examples, in response to the indication that a fuel injector is degraded, engine operating parameters may be adjusted, which may include shutting down the engine, as indicated at 516. A stuck open or closed fuel injector may cause engine degradation, and thus in some examples the engine may be automatically shut down once fuel injector degradation is determined. However, in other examples, particularly if the fuel injector is determined to be stuck closed, the engine may still be able to operate, but certain operating parameters may be adjusted to compensate for the degraded injector. For example, the engine may operate with reduced engine output with the cylinder coupled to the degraded fuel injector deactivated. In another example, if the degraded fuel injector is a gaseous fuel injector (e.g., gas admission valve), the cylinder may be operated with only liquid fuel. Method 500 then returns, for example to perform the method on a subsequent fuel injector.

FIG. 6 is a diagram 600 illustrating example parameters during a fuel injector event. Time is depicted along the vertical axis and each respective parameter (current and voltage) is depicted along the horizontal axis. The first subplot 602 in FIG. 6 shows the controlled current 608 in the injector during a typical injection cycle for a liquid fuel injector. The second subplot 604 shows an unfiltered PWM voltage. With regard to FIG. 4, this voltage is the input to the EMI filter. In this example, the PWM signal is a 100 kHz square wave with a duty cycle that is controlled in a feedback loop that is designed to track a desired reference current profile in the injector coil. The third subplot 606 shows the filtered PWM voltage. This signal is the voltage seen at the injector coil and is smoother than the unfiltered PWM voltage.

FIG. 7 is a diagram 700 that shows the power spectrums associated with the unfiltered and the filtered PWM voltage signals in FIG. 6. In this plot, the desired signal spectral content is below 10 kHz. Both curves indicate high frequency energy at 100 kHz and all of its harmonics; however, the spectral energy in the filtered PWM voltage (black line) has been reduced by more than 15 dB below the desired spectral energy components at low frequency. The spectral energy in the unfiltered voltage is higher than the desired spectral energy components at low frequency. All of the high frequency spectral energy (100 kHz and its harmonics) is being contained by the EMI filter.

An embodiment of system for controlling electromagnetic interference (EMI) in a drive circuit is provided. The system comprises a power supply; a load; a harness coupling the power supply to the load; a shield coupled to the harness; and an EMI filter coupled between the power supply and the load. The EMI filter comprises a differential filter and a differential-common mode filter. In an example, the differential filter comprises an inductor, a capacitor, and a damping network, the damping network including a resistor and a capacitor. In an example, the differential-common mode filter comprises a first inductor and capacitor set and a second inductor and capacitor set, where each capacitor is coupled to ground. In one example, the load is a solenoid. The solenoid may open a liquid fuel injector and/or a gaseous fuel admission valve of an engine.

The system further comprises a switch coupled between the power supply and the load, the switch configured to be turned on and off by a control unit to generate a pulse width modulated signal from the power supply to the load. The differential filter may be coupled between the switch and the load, and the differential-common mode filter may be coupled between the differential filter and the load.

A further embodiment for a system for controlling electromagnetic interference (EMI) may be included in a wheeled vehicle, such as locomotive, automobile, maul haul truck, or other wheeled vehicle. The system comprises a fuel injector for supplying fuel to a cylinder of an engine of the wheeled vehicle; and a drive circuit driving the fuel injector.

The drive circuit comprises a power supply; a harness coupling the power supply to the fuel injector; a shield coupled to the harness; and an EMI filter coupled between the power supply and the load. The EMI filter includes a differential filter and a common-mode differential filter.

In an example, the harness comprises a high-side line and a low-side line. The drive circuit may further comprise a high-side switch between the power supply and the fuel injector on the high-side line and a control unit to control the high-side switch to generate a pulse width modulated signal from the power supply to the fuel injector. The control unit may be located in a separate cab of the wheeled vehicle from the engine, and the harness may extend from the control unit to the fuel injector.

Another embodiment relates to a system for controlling electromagnetic interference (EMI) in a wheeled vehicle. The system comprises an engine having at least two cylinders, each cylinder having a liquid fuel injector and a gaseous fuel admission valve to supply liquid and gaseous fuel thereto; and a drive circuit driving each liquid fuel injector and gaseous fuel admission valve of two of the at least two cylinders. The drive circuit comprises a power supply; a first cable (e.g., a high-side line) from the power supply to a supply node; a high-side switch in the first cable; a differential filter in the first cable; and a differential-common mode filter, where the differential-common mode filter includes a first capacitor-inductor set in the first cable and a plurality of second capacitor-inductor sets, each liquid fuel injector and gaseous fuel admission valve comprising a solenoid coupled to the supply node via respective supply lines, each solenoid coupled to a respective second capacitor-inductor set via a respective second cable (e.g., low-side line), each solenoid coupled to ground via a respective low-side switch.

The differential filter comprises an inductor, a capacitor, and a damping network, the damping network including a resistor and a capacitor. Each respective second capacitor-inductor set is coupled between a respective solenoid and low-side switch. The power supply is configured to supply a voltage in a range of 90-120V to the first cable. In one example, the power supply supplies a voltage of 110V. The system further comprises a control unit to control the high-side switch and each respective low-side switch, the high-side switch controllable to switch at a rate in a range of 90,000 to 110,000 times per second.

An embodiment for a system comprises a poly-modal filter coupled to a load device; a shield disposed between the load device and the poly-modal filter; and the poly-modal filter comprises an EMI filter and a differential-common mode filter. The EMI filter is operable to filter high frequency spectral energy to therefore be contained by the EMI filter inside a control unit. The EMI filter creates a filter choke that results in a slew-limited current profile in response to a short circuit. The filter choke enables a threshold amount of time for the control unit to open a high-side switch in response to the short circuit. The differential-common mode filter simultaneously rejects both differential noise and common mode noise. The load device may be a solenoid in one example. The solenoid may be coupled to a liquid fuel injector or to a gas admission valve of an engine. The system further comprises a switch operable to generate a pulse width modulated signal to the load device.

Another embodiment for a system comprises a switch operable to generate a pulse width modulated voltage signal; a poly-modal filter comprising an EMI filter and a differential-common mode filter, the poly-modal filter operable to generate a filtered pulse width modulated voltage signal to control a solenoid of a fuel injector of an engine; a shield disposed between the solenoid and the poly-modal filter; and a control unit. The control unit is configured to control the switch based on a reference current profile of the solenoid and to indicate degradation of the fuel injector based on the filtered pulse width modulated voltage signal and sensed current at the solenoid.

The control unit is configured to determine an impedance of the solenoid based on the filtered pulse width modulated voltage signal and sensed current, and if the impedance changes by less than a threshold amount over a given period of time, the control unit is configured to indicate the fuel injector is degraded. the control unit is configured to adjust one or more engine operating parameters responsive to the indication of degradation of the fuel injector.

The EMI filter is operable to filter high frequency spectral energy to therefore be contained by the EMI filter, and wherein the differential-common mode filter simultaneously rejects both differential noise and common mode noise. The system further comprises a harness coupled between the poly-modal filter and the solenoid, where the shield is coupled to the harness. The poly-modal filter may be housed in the control unit.

A further embodiment for a system comprises an engine having a plurality of cylinders arranged into one or more sets of two cylinders, each cylinder including a liquid fuel injector and a gas admission valve coupled thereto and at least one drive circuit, each drive circuit being coupled to a respective set of two cylinders. Each drive circuit comprises a poly-modal filter coupled to each solenoid of each liquid fuel injector and gas admission valve of the respective set of two cylinders; a shield disposed between the poly-modal filter and each solenoid of each liquid fuel injector and gas admission valve of the respective set of two cylinders; and the poly-modal filter comprises an EMI filter and a differential-common mode filter.

The EMI filter comprises an inductor, a capacitor, and a damping network including a resistor and capacitor, and thereby to filter high frequency spectral energy from reaching each respective solenoid. The differential-common mode filter comprises a high-side inductor and capacitor and a plurality of low-side inductor and capacitor sets, each low-side inductor and capacitor set coupled to a respective solenoid of each liquid fuel injector and gas admission valve of the respective set of two cylinders, and thereby to prevent both differential noise and common mode noise from reaching each respective solenoid.

The drive circuit further comprises a switch operable to generate a pulse width modulated voltage signal. The pulse width modulated voltage signal may be in a range of 90-120 V and switch at a frequency in a range of 90-110 KHz.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a poly-modal filter coupled to a solenoid of an engine fuel system; and
a shield disposed between the solenoid and the poly-modal filter;
wherein the poly-modal filter comprises an EMI filter and a differential-common mode filter.

2. The system of claim 1, wherein the EMI filter is operable to filter high frequency spectral energy to therefore be contained by the EMI filter inside a control unit.

3. The system of claim 2, wherein the EMI filter creates a filter choke that results in a slew-limited current profile in response to a short circuit.

4. The system of claim 3, wherein the filter choke enables a threshold amount of time for the control unit to open a high-side switch in response to the short circuit.

5. The system of claim 1, wherein the differential-common mode filter simultaneously rejects both differential noise and common mode noise.

6. The system of claim 1, wherein the solenoid is coupled to a liquid fuel injector of the engine fuel system.

7. The system of claim 1, wherein the solenoid is coupled to a gas admission valve of the engine fuel system.

8. The system of claim 1, further comprising a switch operable to generate a pulse width modulated signal to the solenoid.

9. A system, comprising:
a switch operable to generate a pulse width modulated voltage signal;
a poly-modal filter comprising an EMI filter and a differential-common mode filter, the poly-modal filter operable to generate a filtered pulse width modulated voltage signal to control a solenoid of a fuel injector of an engine;
a shield disposed between the solenoid and the poly-modal filter; and
a control unit configured to control the switch based on a reference current profile of the solenoid, the control unit further configured to determine an impedance of the solenoid based on the filtered pulse width modulated voltage signal and sensed current at the solenoid, and if the impedance changes by less than a threshold amount of a given period of time, the control unit is configured to indicate the fuel injector is degraded.

10. The system of claim 9, wherein the control unit is configured to adjust one or more engine operating parameters responsive to the indication of degradation of the fuel injector.

11. The system of claim 9, wherein the EMI filter is operable to filter high frequency spectral energy to therefore be contained by the EMI filter, and wherein the differential-common mode filter simultaneously rejects both differential noise and common mode noise.

12. The system of claim 9, further comprising a harness coupled between the poly-modal filter and the solenoid, where the shield is coupled to the harness.

13. The system of claim 9, wherein the poly-modal filter is housed in the control unit.

14. A system comprising:
an engine having a plurality of cylinders arranged into one or more sets of two cylinders, each cylinder including a liquid fuel injector and a gas admission valve coupled thereto; and
at least one drive circuit, each drive circuit being coupled to a respective set of two cylinders and comprising:
a poly-modal filter coupled to each solenoid of each liquid fuel injector and gas admission valve of the respective set of two cylinders; and
a shield disposed between the poly-modal filter and each solenoid of each liquid fuel injector and gas admission valve of the respective set of two cylinders;
wherein the poly-modal filter comprises an EMI filter and a differential-common mode filter.

15. The system of claim 14, wherein the EMI filter comprises an inductor, a capacitor, and a damping network including a resistor and capacitor, to filter high frequency spectral energy from reaching each respective solenoid.

16. The system of claim 14, wherein the differential-common mode filter comprises a high-side inductor and capacitor and a plurality of low-side inductor and capacitor sets, each low-side inductor and capacitor set coupled to a respective solenoid of each liquid fuel injector and gas admission valve of the respective set of two cylinders, to prevent both differential noise and common mode noise from reaching each respective solenoid.

17. The system of claim 14, wherein the drive circuit further comprises a switch operable to generate a pulse width modulated voltage signal.

18. The system of claim 17, wherein the pulse width modulated voltage signal is in a range of 90-120 V and switches at a frequency in a range of 90-110 KHz.

* * * * *